Jan. 28, 1930.  W. N. MISCHLER  1,745,180
CONNECTION FOR ELECTRIC CONDUCTORS

Filed Nov. 3, 1923

Inventor:
William N. Mischler,
by Alexander S. ----
His Attorney.

Patented Jan. 28, 1930

1,745,180

UNITED STATES PATENT OFFICE

WILLIAM N. MISCHLER, OF SCHENECTADY, NEW YORK, ASSIGNOR TO GENERAL ELECTRIC COMPANY, A CORPORATION OF NEW YORK

CONNECTION FOR ELECTRIC CONDUCTORS

Application filed November 3, 1923. Serial No. 672,649.

It is the object of my present invention to provide a connection or union between metals of dissimilar properties, for example copper and tungsten, which will be strong mechanically and will possess a high electric conductivity.

Copper cannot be readily welded to tungsten under ordinary conditions. In the manufacture of incandescent lamps tungsten filaments have been joined to electric leads by an electric arc using nickel or iron as an alloying or brazing metal. When this method is applied unchanged to the welding of heavy tungsten wires to flexible copper wires which are subjected to flexures during use, then the connection is apt to break off adjacent the junction due to the embrittling effect of the weld.

In accordance with my invention, I have provided a construction whereby the weld between dissimilar metals of the described character may be made while preserving the flexibility and strength of the copper conductor. This advantageous result is obtained by providing the copper conductor adjacent the weld to the conductor of tungsten or the like with a relatively stiff reinforcement of nickel or iron, for example, as a surrounding shell, or as a core, which assists by alloyage to produce a good weld connection and which also holds a section of the copper wire adjacent the weld rigid, bends occurring at a region removed from the weld where the flexibility of the copper wire is unimpaired.

Figure 1:
Figure 2:
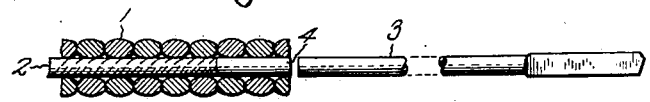
Figure 3:
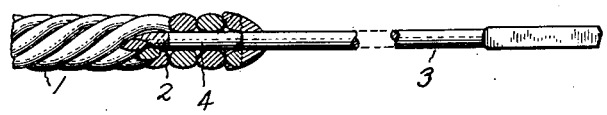
Figure 4:
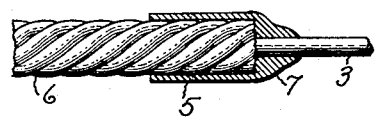
Figure 5:

The accompanying drawing illustrates two embodiments of my invention, Figs. 1, 2 and 3 illustrating a construction in which the reinforcing wire constitutes a core and Figs. 4 and 5 another construction in which the reinforcements constitute a shell about the flexible wire or cable.

In the construction shown in Fig. 1 the copper wire is in the form of a flexible, stranded copper cable 1. This cable is provided with a core 2 of yielding, destructible material, such as a cord of cotton, or the like. When a weld to a stiff, refractory metal, such as the tungsten wire 3 is to be made, an end section of the cord is removed, conveniently by burning and a section 4 of a metal of the iron group is inserted. For convenience, I employ an alloy of nickel and iron, as for example, a short section of the so-called Dumet wire, as described in Van Keuren Patent 1,268,647 of June 4, 1918, as this has both a relatively low fusing point and is provided with a thin coating of a borax flux. The tungsten wire then is placed in contact with the end of the reinforced wire and a weld is produced, conveniently by electric resistance welding, causing both the copper wire and the core 4 to unite by fusion at the contacting ends. As nickel and iron will alloy both with the tungsten and the copper a sound joint or weld is produced, as indicated in section in Fig. 3, and by an exterior view in Fig. 1. When such a junction is subjected to bends the distortion of the flexible cable will occur at the end of the core 4 which is remote from the weld, the core holding the section adjacent the weld rigid.

In some cases, as shown in Figs. 4 and 5, the reinforcing section constitutes a shell or sheath 5 about the flexible cable 6; which in this case need not contain a core. As shown in Fig. 5 the sheath 5 is constituted by a sheet of nickel bent into tubular form. When a weld with the tungsten wire 3 is produced as indicated at 7, part of the nickel sheath flows in and alloys with the copper to produce a strong weld. The external sheath likewise holds rigid the copper wire adjacent the weld, bends occurring remote from the weld, as indicated in Fig. 5.

When in the above description and in the claims I have referred to wires of copper, I wish to include also other cupreous metals and also silver, and when I have referred to tungsten, I wish also to include other metals which cannot be joined readily to cupreous metals, for example, molybdenum. My invention, indeed, is applicable to the production of a strong union between a flexible conductor and a stiff conductor of any constitution or composition when it is desired to prevent bending the flexible conductor directly adjacent the weld where the metal has become brittle or weakened.

What I claim as new and desire to secure by Letters Patent of the United States, is:—

1. The method of joining a flexible copper conductor with a tungsten conductor which comprises applying a reenforcing sleeve which is readily fusible to copper and tungsten, to one end of said flexible conductor, placing the reenforced copper conductor and the tungsten conductor in abutting relation to one another and welding said conductors to the portion of the reenforcing member which is adjacent the abutting ends of said conductors.

2. A composite wire consisting of a flexible conductor and a stiff conductor disposed in end to end relation with respect to one another and a stiff reenforcing member secured by fusion to the adjacent ends of said conductors, said reenforcing member extending an appreciable distance along the flexible conductor beyond the point of fusion with said flexible conductor, said reenforcing member also extending an appreciable distance along the stiff conductor.

3. A composite wire consisting of a flexible conductor and a tungsten conductor disposed in end to end relation with one another, a reenforcing sleeve surrounding the flexible conductor, said sleeve being fused at one end thereof to the adjacent end portions of said conductors and extending an appreciable distance along said flexible conductor and beyond the point of fusion with said flexible conductor, said sleeve also extending an appreciable distance along the tungsten conductor.

In witness whereof, I have hereunto set my hand this 2nd day of November, 1923.

WILLIAM N. MISCHLER.